(12) United States Patent
Zlotnick (10) Patent No.: US 9,432,130 B2
(45) Date of Patent: Aug. 30, 2016

(54) FOOTWEAR SEISMIC COMMUNICATION SYSTEM

(75) Inventor: Zvi Zlotnick, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 345 days.

(21) Appl. No.: 13/885,076

(22) PCT Filed: Nov. 7, 2011

(86) PCT No.: PCT/IB2011/054956
§ 371 (c)(1),
(2), (4) Date: May 13, 2013

(87) PCT Pub. No.: WO2012/066450
PCT Pub. Date: May 24, 2012

(65) Prior Publication Data
US 2013/0242703 A1     Sep. 19, 2013

(30) Foreign Application Priority Data

Nov. 15, 2010 (IL) .......................................... 209331

(51) Int. Cl.
*H04B 1/06*     (2006.01)
*H04B 13/02*    (2006.01)

(52) U.S. Cl.
CPC ................................... *H04B 13/02* (2013.01)

(58) Field of Classification Search
CPC ....................................................... H04B 13/02
USPC ........................................................ 367/135
See application file for complete search history.

(56) References Cited

U.S. PATENT DOCUMENTS

| 3,273,112 | A | * | 9/1966 | Hobson | 367/191 |
| 3,329,957 | A | * | 7/1967 | Hoynes | 343/718 |
| 7,307,915 | B2 | * | 12/2007 | Kimball | 367/134 |
| 2007/0223313 | A1 | | 9/2007 | Kimball | |

OTHER PUBLICATIONS

International Search Report of PCT Application No. PCT/IB2011/054956 dated Mar. 14, 2012.

* cited by examiner

*Primary Examiner* — Mark Hellner
(74) *Attorney, Agent, or Firm* — Pearl Cohen Zedek Latzer Baratz LLP (57) ABSTRACT

A footwear seismic communication unit is provided herein. The unit includes footwear attachable to a foot or feet of a user, including at least one sole portion for placing on a ground and at least one seismic transducer device located within said at least one sole. The unit further includes a processing module, a transmitting interface module, and a receiving interface module.

15 Claims, 4 Drawing Sheets

FOOTWEAR SEISMIC COMMUNICATION SYSTEM

CROSS-REFERENCE TO RELATED APPLICATIONS

This application is a National Phase Application of PCT International Application No. PCT/IB2011/054956, International Filing Date Nov. 7, 2011, entitled "FOOTWEAR SEISMIC COMMUNICATION SYSTEM", published on May 24, 2012 as International Phase Application Publication Number WO 2012/066450, claiming priority of Israel Patent Application No. 209331, filed Nov. 15, 2010, both of which are incorporated herein by reference in their entirety.

BACKGROUND

1. Technical Field

The present invention relates to communication. More specifically, the present invention relates to a footwear seismic communication system.

2. Discussion of the Related Art

Communication is defined as a process of transferring information from one entity to another. This process requires that both entities share, for the sake of successfully communicating, a repertoire of signs and a set of semiotic rules.

Basic human communication includes non-verbal communication (such as physical and visual communications), and verbal communication.

Acoustic communication is an ancient form of communication. It involves sending and receiving information using acoustic waves. The information may be encoded by the sender and decoded by the receiver.

Acoustic communication can involve propagating acoustic waves through the air, ground or water. However, acoustic wave propagation characteristics are substantially different for each medium.

Underwater acoustic communication, for example, involves sending information in the form of acoustic waves underwater. There are several ways of communicating underwater, but the most common way is using hydrophones. Underwater acoustic communication is difficult due to various factors, such as, for example, multi-path propagation (e.g. echoes from the bottom and surface of the ocean), time variations of the channel, small available bandwidth and significant signal attenuation, especially over long ranges. Consequently, low data rates may be achieved (compared to other forms of communication).

In U.S. Pat. No. 3,273,112 (Hobson) there was disclosed a communication system that utilizes the crust of the Earth as wave propagation medium.

US 2009/316530 (Bunyard et al.) disclosed system and method for communications in a mine provides for seismic wave generation through mine strata which includes specific location identification within the mine can be used in emergency situations by trapped miners. A seismic transmitting transducer imparts seismic waves onto a rod embedded into the strata, which is tunable by use of a slideable manifold that couples the transducer to a rod. Likewise, a receiving transducer which may also be coupled to a rod via a manifold may be configured to receive the seismic wave. The seismic wave may be modulated to produce a message or portion of a message that may be decoded at the receiving location. The transducers may be configured to utilize frequency hopping spread spectrum techniques. A geophone may be used as the receiving transducer.

CN 101383663 disclosed a through-the-earth communication system which comprises an earth coupling speaker and an earth coupling pick-up device, and stratum medium is arranged between the earth coupling speaker and the earth coupling pick-up device. A coder is arranged at a signal input end and is connected with a spread spectrum modulation and power amplifier which are connected with the earth coupling speaker, and the earth coupling speaker is positioned on the stratum or in the stratum at one side of a transmitting terminal. At the signal output end, the earth coupling speaker is positioned on the stratum or in the stratum at one end of a receiving terminal, the signal is received by the earth coupling pick-up device, the earth coupling pick-up device is connected with a low-noise amplification and frequency selection filter which is connected with a spread spectrum demodulator, and the reduction signal is output by the spread spectrum demodulator.

CN 1251961 disclosed very low frequency (VLF) ground wave telephone equipment in VLF band (20-300 KHz) is composed of user extensions, switch, ground wave telephone power amplifier-transmitter; ground coupled transmitting network and power supply. The user extensions consist of emitter, receiver and dialing circuit. Said ground coupled transmitting network is composed of feedback line, impedance converter, transmitting antennas, high-voltage (10 KV) power transmission line, and grounding electrode networks.

U.S. Pat. No. 2,389,432 (Hansell) disclosed a communication system that uses pulses through Earth.

In US 2007/223313 (Kimball) there was disclosed a seismic modem. The system includes at least one transmitting unit, that at least one transmitting unit comprising a first processing unit encoding a first signal, the first processing unit being coupled to a digital to analog converter, an amplifier amplifying the first signal, and a seismic pressure wave inducer transmitting the first signal to a geological feature and at least one receiving unit, the receiving unit comprising at least one receiver coupled to the geological feature for receiving the first signal, and an analog to digital converter whereby the first signal is transferred from the geophone and is conveyed to a second processing unit, the second processing unit being configured to identify and decode the first signal.

BRIEF SUMMARY

One aspect of the invention provides a footwear seismic communication unit. The unit includes footwear attachable to a foot or feet of a user, including at least one sole portion for placing on a ground and at least one seismic transducer device located within said at least one sole. The unit further includes a processing module, a transmitting interface module, and a receiving interface module.

Furthermore, according to embodiments of the present invention, the seismic transducer device includes a container defining a chamber filled with a medium having controllable physical properties; and a hydrophone disposed in the medium and affixed to the container. At least a portion of the container, being a membrane, is controllable in terms of tension level over the membrane. The seismic transducer is configurable in at least one of: transmitter configuration and receiver configuration. In the transmitter configuration the seismic transducer is arranged to transmit seismic waves having a specified pattern into a second medium coupled to the membrane, and in the receiver configuration the seismic transducer is arranged to receive seismic waves having a specified pattern propagating through a second medium coupled to the membrane.

Furthermore, according to embodiments of the present invention, the unit includes a communication module.

Furthermore, according to embodiments of the present invention, the communication module comprises a wireless communication module.

Furthermore, according to embodiments of the present invention, the unit further includes an input/output (I/O) device for displaying information and for inputing commands.

Furthermore, according to embodiments of the present invention, the input/output device includes a strap for strapping to a hand of the user.

Furthermore, according to embodiments of the present invention, the unit further includes an earphone for emitting audio signals in response to seismic signals received by the transducer device of the unit.

Furthermore, according to embodiments of the present invention, the audio signals are selected from the group of audio signals consisting of seismic signals picked up by the transducer device and transposed into the audio range of a human ear, audio signals or messages which are played when a specific condition is met and audio signals in the form of vibrations designed to be sensed by the user as they travel through the skull bone and are picked up by the ear.

Furthermore, according to embodiments of the present invention, said at least one seismic transducer device is located in a heel of said at least one sole portion.

Furthermore, according to embodiments of the present invention, the footwear comprises a pair of footwear platforms attachable to the feet of the user.

Furthermore, according to embodiments of the present invention, the footwear is selected from a group of footwear consisting of shoes, sandals, platforms attachable directly to the foot or the feet of the user and platforms attachable indirectly to the foot or the feet of the user.

Furthermore, according to embodiments of the present invention, the footwear communication unit is designed to transmit a transmission selected from the group of transmissions consisting of simple signals, short encoded messages, long communication messages, automated messages, messages transmitted periodically, messages transmitted when a specific condition is met and messages transmitted when a received signal is identified.

Furthermore, according to embodiments of the present invention, there is provided a footwear communication system. The system includes a plurality of footwear seismic communication units. Each of the units include footwear attachable to a foot or feet of a user, including at least one sole portion for placing on a ground; at least one seismic transducer device located within said at least one sole; a processing module; a transmitting interface module; and a receiving interface module.

Furthermore, according to embodiments of the present invention, the footwear seismic communication units are designed to intercommunicate.

Furthermore, according to embodiments of the present invention, there is provided a method for footwear seismic communication. The method includes providing footwear attachable to a foot or feet of a user, the footwear including at least one sole portion for placing on a ground, at least one seismic transducer device located within said at least one sole, a processing module, a transmitting interface module, and a receiving interface module. The method further includes wearing the footwear on a foot or feet of the user, receiving seismic signals by said at least one seismic transducer device and the receiving module and processing the seismic signals by the processing module.

Furthermore, according to embodiments of the present invention, the method further includes providing a communication module; and displaying information and inputting commands using an input/output (I/O) device communicating with the unit using the communication module.

Furthermore, according to embodiments of the present invention, the method further includes emitting audio signals using an earphone in response to seismic signals received by the transducer device of the unit.

Furthermore, according to embodiments of the present invention, the audio signals are selected from the group of audio signals consisting of seismic signals picked up by the transducer device and transposed into the audio range of a human ear, audio signals or messages which are played when a specific condition is met and audio signals in the form of vibrations designed to be sensed by the user as they travel through the skull bone and are picked up by the ear.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "seismic communication" in the context of the present invention refers to transmitting or receiving seismic signals, which are transmitted through the ground as a form of bilateral or multilateral communication, or to receiving and/or detecting seismic signals transmitted through the ground which are generated by human or other activity. "Ground" in the context of the present invention refers to any medium on whose surface a footwear seismic communication system, according to embodiments of the present invention may be placed in contact with. Without derogating generality, in some embodiments of the present invention, "ground" may include, for example, soil, paved roads and sidewalks, tiles, concrete and stone. In some embodiments of the present invention "ground" may be covered with various kinds of an unleveled layer, such as, for example, grass, foliage, pebbles, organic or inorganic debris, dirt, water, oil, or other liquids.

A footwear seismic communication unit, according to embodiments of the present invention, may include a seismic transmitter, a seismic receiver, or a seismic transducer. Additionally, a footwear seismic communication unit may include a processor, an input/output interface, a display and possibly other peripheral interfaces too. A footwear communication unit may include an encoder, for encoding a communication message to be transmitted, a decoder for decoding received communications, or both.

According to embodiments of the present invention, communication may be established between two or more footwear seismic communication units (intercommunication), or between one or more footwear communication units and other seismic communication units (e.g. a stationary seismic communication unit incorporating a seismic transducer coupled to the ground).

Seismic communications, according to embodiments of the present invention, may be established between two or more footwear seismic units (intercommunication), or between one or more footwear seismic units and one or more other seismic communication unit, which are not footwear based (or attached to a foot). Such seismic communication unit may be, for example, a stationary seismic communication unit.

Furthermore, seismic communications, according to embodiments of the present invention, may be established in the form of listening mode, where one or more seismic communication units are used to detect seismic signals. In some embodiments of the present invention one or more seismic communication units are used to identify the activity associate with the detected seismic signal. The identified activity may be reported in the form of an audio signal or message as well as in the form of a video signal or message.

A footwear system for seismic communication, according to embodiments of the present invention, may be used in various kinds of communication.

For example, a footwear system for seismic communication, according to embodiments of the present invention, may be used for simple low-level communication. Low-level communication may include transmission and reception of a short message or information segment from one communication unit to another, such as, for example, an identification code, authentication code or the like.

For example, a footwear system for seismic communication, according to embodiments of the present invention, may be used for friend/foe identification. In this instance friendly users would be equipped with footwear systems for seismic communication so that when their footsteps are detected by a monitoring station or other users wearing footwear systems for seismic communication an identification transmission transmitted by the worn footwear systems that would be identified and verified by the monitoring station or by the other users.

Seismic communication, according to embodiments of the present invention, may include manually initiated transmissions as well as automated transmissions.

A communication transmission, according to embodiments of the present invention, may include simple signals, short encoded messages, and even long communication messages, depending on the bandwidth of the available seismic communication.

In some embodiments of the present invention, seismic communication may include automated messages, generated automatically, such as, for example, messages transmitted periodically, or messages transmitted when a specific condition is met, or when a received signal is identified.

Reference is now made to the accompanying figures.

Figure 1:
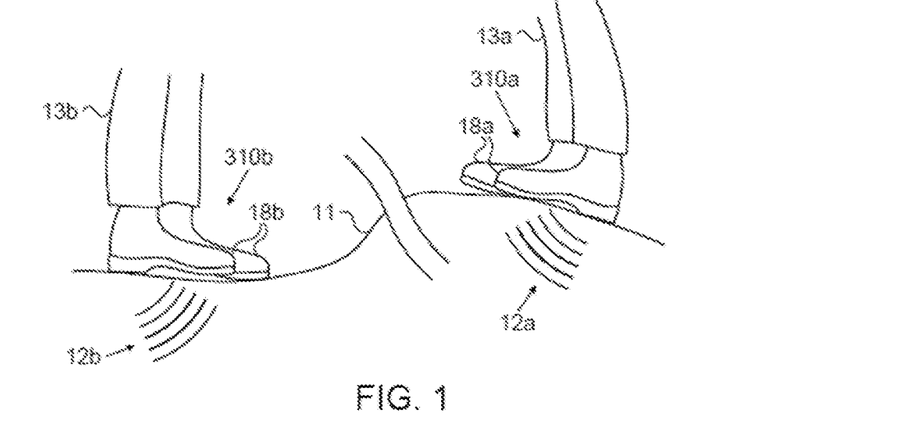
FIG. 1 illustrates a footwear system for seismic communication according to embodiments of the present invention.

FIG. 1 illustrates a footwear system for seismic communication according to embodiments of the present invention.

A footwear seismic communication system, according to embodiments of the present invention may include one or more footwear seismic communication units 310A, 310B, which are each incorporated in one shoe, or a pair of shoes 18A and 18B, worn by users 13A and 13B (whose only feet are shown in the figure), for communicating by transmitting seismic signals, receiving seismic signals or transmitting and receiving seismic signals 12A, 12B using the ground 11 as a transmitting medium.

Figure 2A:
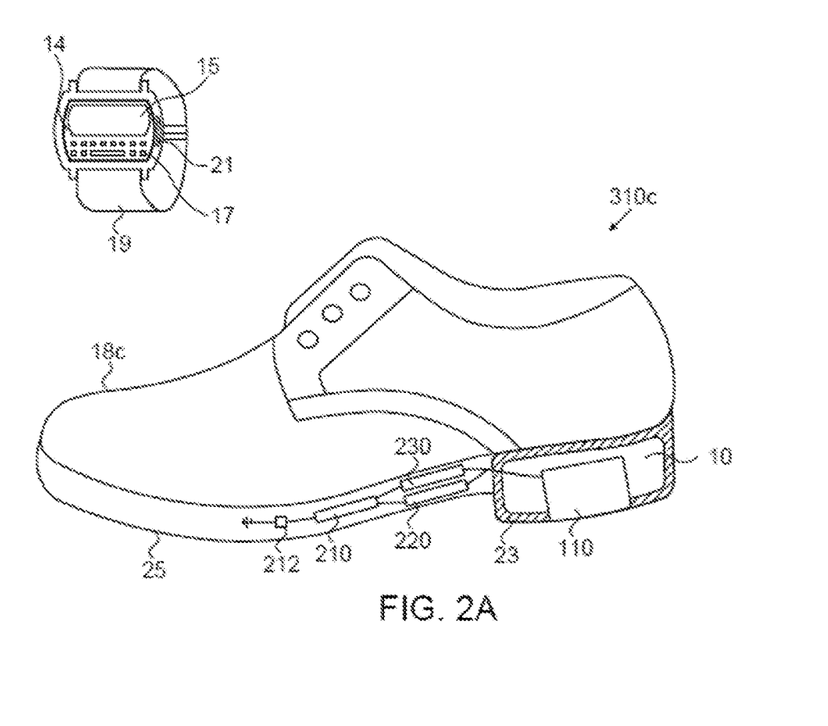
FIG. 2A illustrates a shoe incorporating a seismic communication unit and a complementary input/output interface device, according to embodiments of the present invention.

FIG. 2A illustrates a shoe incorporating a seismic communication unit and a complementary input/output interface device, according to embodiments of the present invention.

Seismic communication unit 310C, according to embodiments of the present invention is incorporated in shoe 18C. A seismic transducer 110 is embedded in the sole 25 of the shoe (e.g. in the heel 23), so as to facilitate good coupling to the ground, with air 10 surrounding the seismic transducer device 110 within the heel. In order to enhance the coupling to the ground, membrane 115 may possess flexible properties (e.g. elastic polymer) so as to allow the membrane to flex in when pressed against a pebble and still maintain relatively large area of the membrane in contact with the surrounding ground.

Alternatively, it is also possible to embed the seismic transducer in the sole 25 tightly, without leaving space between the transducer and the sole material. The system also includes processing module 210, a transmitting interface module 220, and a receiving interface module 230 receiver amplifier, which may be embedded in sole 25, or incorporated otherwise in the shoe. Seismic transducer device 110 is in communication (either via wire line or wireless) with interface modules 220 and 230. A wireless communication interface 212 is provided to facilitate communication between seismic communication unit 310C and a complementary input/output (I/O) interface device 14, which may be worn on the hand of the user (e.g. strapped to the hand of the user by strap 19, like a wristwatch) or otherwise carried by the user, attached to the user's garment, or placed within the reach of the user so as to readily present itself to the user. I/O interface device 14 may include an input device, such as for example, keyboard 17, with which the user may enter commands and input communication information to be transmitted, and an output device, such as for example, display screen 15, which may be used to display received communications and system messages and menus. Keyboard 17 and display screen 15 may be separate or may be incorporated, such as, for example, in a touch screen.

Communication slot 21 (such as, for example, a USB port) may be provided to facilitate wire communication with another communication device.

A communication unit, according to embodiments of the present invention may be incorporated in a single footwear (as shown in FIG. 2A), or incorporated in a pair of shoes. In the latter configuration, according to embodiments of the present invention, one shoe of the pair would serve as a transmitter and the other shoe of the pair would serve as a receiver.

Figure 2B:
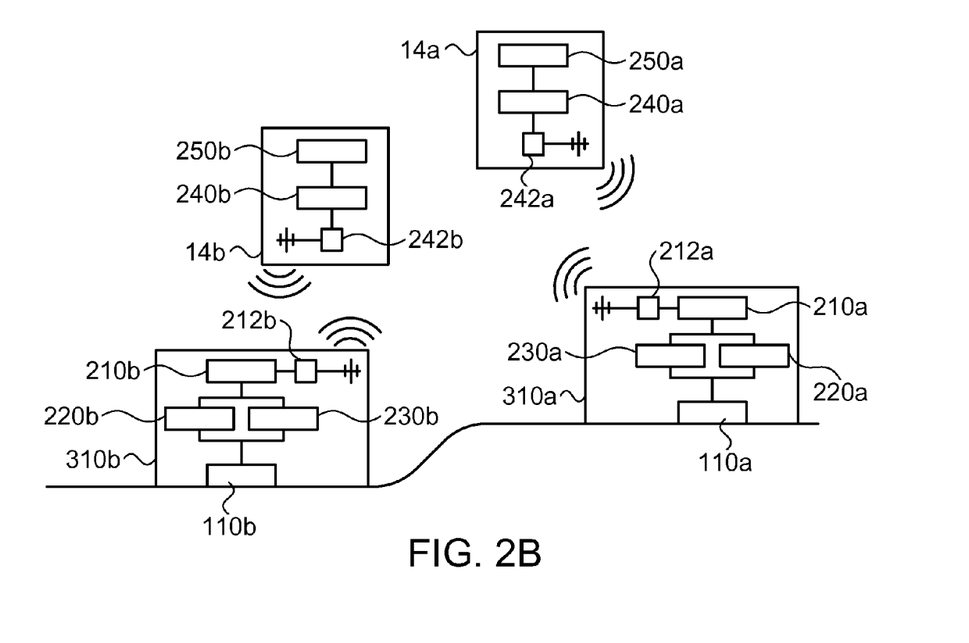
FIG. 2B illustrates a block diagram of the system for seismic communication shown in FIG. 1.

FIG. 2B illustrates a block diagram of the system for seismic communication according to embodiments of the present invention, as shown in FIG. 1.

Seismic communication 310A includes seismic transducer device 110A communicating with transmitting interface module 220A, and a receiving interface module 230A receiver amplifier, each of which communicates with processing module 210A. Wireless communication module 212A is provided to allow communications with complementary I/O interface device 14A, which is strapped to the hand of a first user or otherwise presented to the first user for handling. I/O interface device 14A includes wireless communication module 242A, processor 240A and I/O device 250A (e.g. display device and/or input device, such as keyboard).

Similarly, Seismic communication 310B includes seismic transducer device 110B communicating with transmitting interface module 220B, and a receiving interface module 230B receiver amplifier, each of which communicates with processing module 210B. Wireless communication module 212B communicates with complementary I/O interface device 14B, which is strapped to the hand of a second user or otherwise presented to the second user for handling. Similarly, I/O interface device 14B includes wireless communication module 242B, processor 240B and I/O device 250B.

Figure 3:
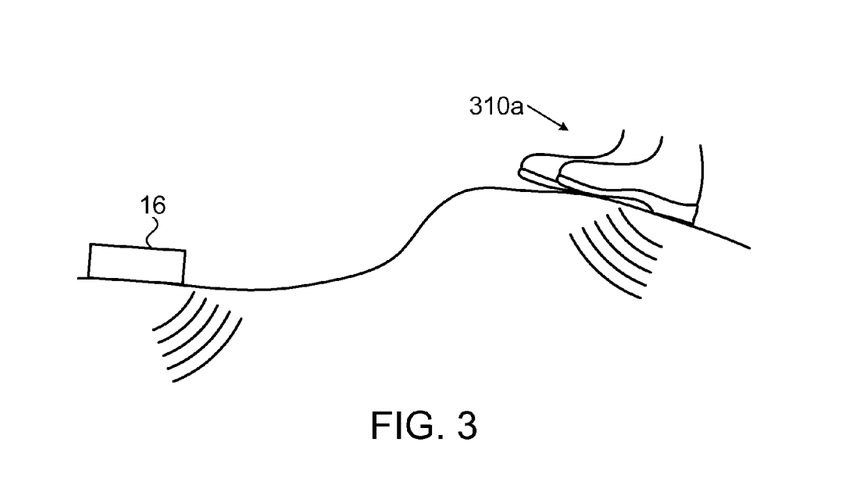
FIG. 3 illustrates a footwear system for seismic communication according to other embodiments of the present invention.

FIG. 3 illustrates a footwear system for seismic communication according to other embodiments of the present invention. In the embodiment depicted in FIG. 3 seismic communication is facilitated between a footwear seismic communication unit 310A and a stationary communication unit 16.

FIGS. 4A-4D are schematic isometric diagrams illustrating seismic transducer devices which may be incorporated in a footwear seismic communication unit according to some embodiments of the present invention.

The transducer devices basically include each a container filled with a medium having controllable seismic impedance, for example, by means of temperature control of fluid or chemical properties. A primary transducer, such as a hydrophone is disposed within the medium and is affixed to the inner walls of the container. At least a portion of the container walls function as a membrane. Properties of the membrane, such as the level are also controllable. Thus, the transducer device may be adjusted in accordance with its ambience for optimizing wave transfer.

Figure 4A:
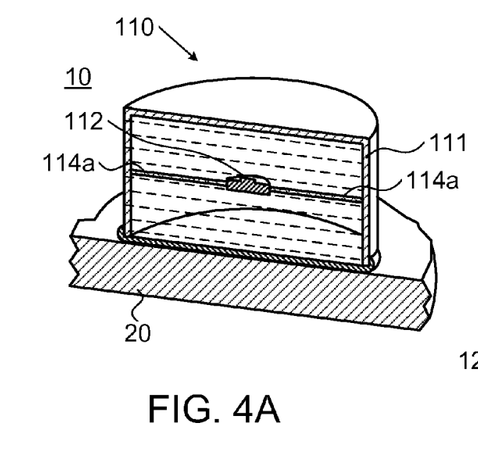
FIGS. 4A-4D are schematic isometric diagrams illustrating seismic transducer devices according to some embodiments of the present invention.

FIG. 4A shows an isometric view of a seismic transducer device 110 according to some embodiments of the invention. Seismic transducer device 110 comprises a container 111 defining a chamber filled with medium 30. Medium 30 exhibits controllable seismic impedance. At least a portion of the walls of container 111 define a membrane 115 that exhibits controllable physical properties. A primary transducer 112 may be affixed to the inner walls of container 111 and may be disposed within medium 30 at a specified height above membrane 115. Primary transducer 112 may be electrically coupled to seismic system generator.

In operation, seismic transducer device 110 may be positioned in a first ambience 10 (e.g., air, such as within the heel of a shoe) such that membrane 115, faces second ambience 20 (e.g., ground) wherein the difference between impedance of the respective ambiances is substantially high, which reduces background noise above ground.

In a first transmitter configuration seismic transducer 112 is configured to receive an electrical signal exhibiting a specified pattern, via the I/O interface, and generate in response to the electrical signal, respective seismic waves directed towards ground 20. Specifically, the electrical signal may exhibit a plurality of specified base frequencies (harmonies) in respective specified amplitudes, over a specified duration of transmission time.

In a second receiver configuration, seismic transducer 112 is configured to receive seismic waves propagating through ground 20 and generate in response, respective electrical signal outputted via I/O interface.

According to some embodiments of the invention, the controllability of the impedance of medium 30 and the physical properties of membrane 115 may be used to adjust the transferability of seismic waves between medium 30 and second ambience 20 and vice versa. Specifically, matching seismic impedance of medium 30 to seismic impedance of second ambience 20 by, for example, increasing the specific gravity of medium 30 may decrease energy losses of seismic waves transfer.

According to some embodiments of the invention, the controllability of the physical properties of membrane 115 may further be used to adjust the transferability of waves between medium 30 and second ambience 20 and vice versa. Specifically by adjusting the tension over membrane 115 the geometric shape of the membrane surface and match the geometric shape of the overlapping portion of second ambiance 20 such that excessive air pockets (first ambience 10) are eliminated to yield an airtight coupling of seismic transducer device 110 to second ambiance 20 (e.g., the ground). In one embodiment, fastening elements 118A-118D are in operative association with the rim of membrane 115 and are configured to control the tension over membrane 115. Other means of controlling the tension and the shape of membrane 115 may be used.

According to some embodiments of the invention, further controllability of the spatial shape, and other physical properties of container 111 may be used to adjust the radiation curve of the seismic waves generated by seismic transducer device 110. Specifically, types of seismic waves as well as modes of operation and configurations may be thus controlled and adjusted in order to meet specific application requirements.

Figure 4B:
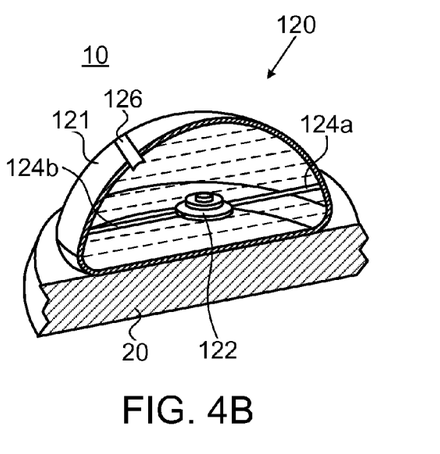

FIG. 4B shows an isometric view of another seismic transducer device 110 according to some embodiments of the invention. Seismic transducer device 120 comprises a container 121 defining a chamber filled with medium 30. Seismic transducer 122 may be affixed to the inner walls of container 121 via support elements 124A and 124B. Also here, medium 30 exhibits controllable seismic impedance. Controlling the seismic impedance of medium 30 may be achieved, for example, by adding a substance having higher (or lower) specific gravity via nozzle 126. Alternatively, particles such as small balls may be added via nozzle 126. The seismic impedance of medium 30 may also be controlled by heating or cooling medium 30. Container 121 may be made of a flexible, seismically transparent material. The flexibility of container 121 may be selected such that membrane 125 may autonomously acquire the shape of the overlapping surface of second ambience 20. Alternatively, further amounts of medium 30 may be inputted via nozzle 126 to control the tension over membrane 125.

Figure 4C:
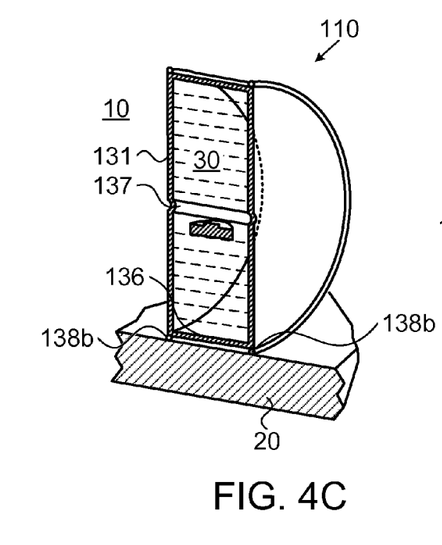

FIG. 4C shows an isometric view of yet another seismic transducer device 130 according to some embodiments of the invention. Seismic transducer device 130 comprises a container 131 shaped as a cylinder and rotatable along an axis 137 to for a roller. Container 131 defines a chamber filled with medium 30. Seismic transducer 132 may be rotatable affixed to the inner walls of container 131 in proximal to axis 137 such that when container 131 rotates around axis 137, Seismic transducer 132 remains stationary, in angular terms, in relation to second ambiance 20 (e.g., ground). Also here, medium 30 exhibits controllable seismic impedance. Additionally, tension over membrane 136 may be controlled using fastening elements 138A-138D scattered along the rim of membrane 136.

Figure 4D:
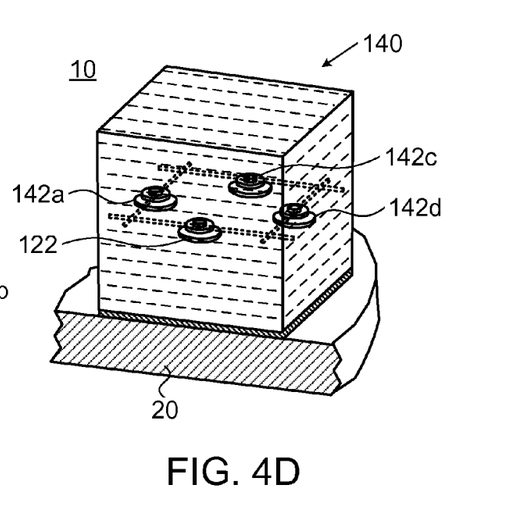

FIG. 4D shows an isometric view of yet another seismic transducer device 140 according to some embodiments of the invention. Seismic transducer device 140 comprises a container 141 in the shape of a box defining a chamber filled with medium 30 by means of some array of primary transducer. A plurality of seismic transducers 142A-142D may be affixed to the inner walls of container 122 via support elements 144A-144D. Also here, medium 30 exhibits controllable seismic impedance. The use of a plurality of primary transducers in array 142A-142D enable to further control the shape the primary radiation curve of seismic transducer device 140. Specifically, operating each one of seismic transducers 142A-142D at a specified period, a specified magnitude, and in accordance with a specified signal form enables more levels of freedom in shaping the seismic wave radiation curve of seismic transducer device 140.

Due to the relatively limiting nature of seismic communications, when compared with electromagnetic communications (such as for example, RF communication), communication between two seismic units of a seismic communication system according to the present invention would typically comprise short messages, but lengthier messaging may also be made possible.

A footwear seismic communication system can be used in a variety of communication forms, some of which are listed hereinabove:
A. Fully-automated communication, such as, for example, automatically transmitting identification information (e.g. Personal ID Number—PIN) from one or more footwear seismic communication units to one or more other footwear seismic communication units, or one or more other seismic communication units (not footwear), with or without a response communication being transmitted from one or more of receiving units. A response communication may include authentication information, reciprocal identification information, additional information whose distribution is restricted to identified recipients, or other non-classified or non-limited information;
B. Semi-automated communication, such as for example, sending an automated response to a user initiated communication (e.g. responding by transmitting an authentication code to a user generated identification communication); and
C. User generated communication, which involves two or more users communicating between themselves using footwear seismic communication system according to embodiments of the present invention.

Footwear seismic communication systems, according to embodiments of the present invention may be used as an alternative communication method, together with other forms of communication, or solely, when other communication forms cannot be used. For example, it may be advantageous to use a footwear seismic communication system to identify (and authenticate) and thus distinguish members of a prison guard from inmates, members of a police force from civilians, and similarly distinguish between members of an authorized group and other non-authorized persons.

The use of footwear seismic communication system according to embodiments of the present invention may be desired when it is necessary to avoid other communication ways, for example, when it is known that radio communication may be undesirably monitored by unauthorized persons, or in other similar scenarios.

A footwear seismic communication unit may be incorporated in a shoe, sandal or other footwear, and it may also be provided separately to be attached to a foot of a user. In the context of the present invention the term "footwear" is understood to include designated footwear, such as one shoe or a pair of shoes, one sandal or a pair of sandals, or one platform, or a pair of platforms attachable to a foot or feet of a person. Said one platform or pair of platforms may be designed to be attached to the foot or feet of the person directly (e.g. on bare foot or feet). Alternatively, said one platform or pair of platforms may be designed to be removably attached to the foot or feet of the person indirectly, that is attached to footwear worn by the user, so that the user may attach or detach the footwear seismic communication unit at will.

Figure 5:
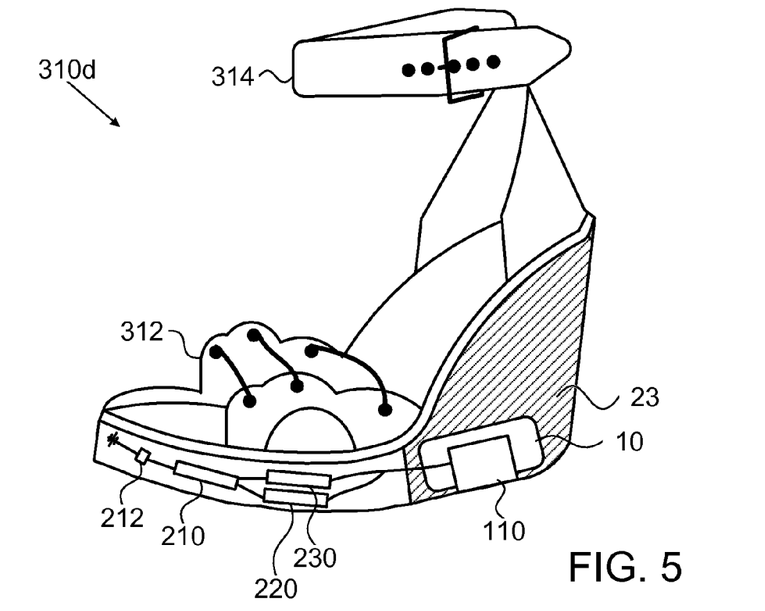
FIG. 5 illustrates a footwear seismic communication unit incorporated in a sandal, according to embodiments of the present invention.

FIG. 5 illustrates a footwear seismic communication unit incorporated in a sandal, according to embodiments of the present invention. Sandal 310D includes sole 25, in which processing module 210, transmitting interface module 220, and a receiving interface module 230 are incorporated. Seismic transducer device 110 is in communication with interface modules 220 and 230. A wireless communication interface 212 is also provided to facilitate communication between seismic communication unit 310D and a complementary input/output (I/O) interface device (see for example FIGS. 2A, 2B). Front strap 312 and back strap 314 are provided to fasten the sandal to the foot of the user.

Figure 6:
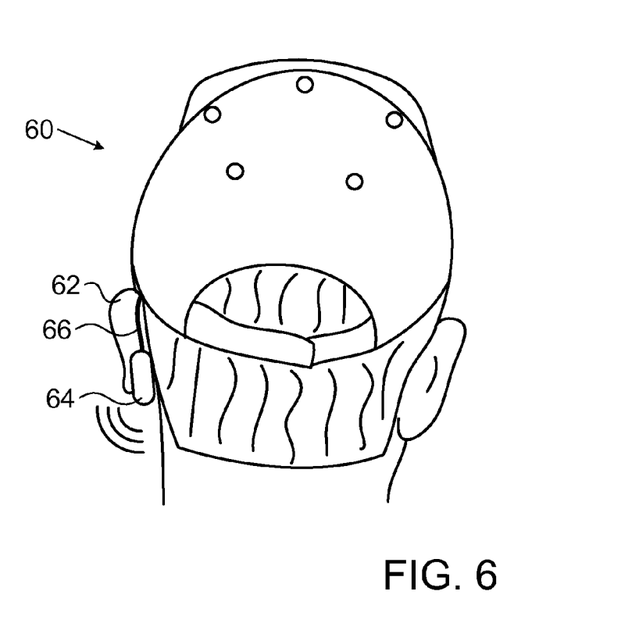
FIG. 6 illustrates an earphone worn on a user's ear for cooperation with a system for seismic communication, according to embodiments of the present invention.

FIG. 6 illustrates an earphone 64 worn on an ear 62 of a user 60 for cooperation with a footwear system for seismic communication, according to embodiments of the present invention. The earphone includes holder 66 for attaching the earphone over the ear.

Earphone 64 is designed to communicate with a system for seismic communication according to embodiments of the present invention, such as for example, the system shown in FIGS. 2A and 2B, and emit audio signals which are within the audio response range of a human ear.

In some embodiment of the present invention, the audio signals may be, for example, the seismic signals picked up by the seismic transducer device of the footwear system for seismic communication, transposed into the audio range of a human ear. In some embodiments of the present invention, the audio signals may be audio signals or messages which are played when a specific condition is met, for example, when the footwear system for seismic communication decodes a message, or identifies the audio signature of an activity from a list of monitored activities associated with known audio signatures (e.g. footsteps, noise associates with specific vehicles, hammering, digging and other monitored activity).

In some embodiments of the present invention the audio signals may be in the form of vibrations designed to be sensed by the user as they travel through the skull bone and are picked up by the ear.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A device comprising:
   a footwear attachable to a foot or feet of a user, including at least one sole portion for placing on a ground;
   at least one seismic transducer device located within the at least one sole;
   a processing module;
   a transmitting interface module; and
   a receiving interface module,
   wherein the at least one seismic transducer device includes:
   a container defining a chamber filled with a medium having controllable physical properties; and a hydrophone disposed in the medium and affixed to the container,
   wherein at least a portion of the container, being a membrane, is controllable in terms of tension level over the membrane,
   wherein the seismic transducer is configurable in both a transmitter configuration and a receiver configuration,
   wherein in the transmitter configuration, the seismic transducer is arranged to transmit seismic waves having a specified pattern into a second medium coupled to the membrane, and
   wherein in the receiver configuration, the seismic transducer is arranged to receive seismic waves having a specified pattern propagating through a second medium coupled to the membrane.

2. The device according to claim 1, further comprising a communication module.

3. The device according to claim 2, wherein the communication module comprises a wireless communication module.

4. The device according to claim 2, further comprising an input/output (I/O) device for displaying information and for inputting commands.

5. The device according to claim 4, wherein the input/output device includes a strap for strapping to a hand of the user.

6. The device according to claim 2, further comprising an earphone for emitting audio signals in response to seismic signals received by the transducer device of the unit.

7. The device according to claim 6, wherein the audio signals are selected from the group of audio signals consisting of seismic signals picked up by the transducer device and transposed into the audio range of a human ear, audio signals or messages which are played when a specific condition is met and audio signals in the form of vibrations designed to be sensed by the user as they travel through the skull bone and are picked up by the ear.

8. The device according to claim 1, wherein said at least one seismic transducer device is located in a heel of said at least one sole portion.

9. The device according to claim 1, wherein the footwear comprises a pair of footwear platforms attachable to the feet of the user.

10. The device according to claim 1, wherein the footwear is selected from a group of footwear consisting of shoes, sandals, platforms attachable directly to the foot or the feet of the user and platforms attachable indirectly to the foot or the feet of the user.

11. The device according to claim 1, designed to transmit a transmission selected from the group of transmissions consisting of simple signals, short encoded messages, long communication messages, automated messages, messages transmitted periodically, messages transmitted when a specific condition is met and messages transmitted when a received signal is identified.

12. A method comprising:
    providing footwear attachable to a foot or feet of a user, the footwear including at least one sole portion for placing on a ground, at least one seismic transducer device located within said at least one sole, a processing module, a transmitting interface module, and a receiving interface module; wearing the footwear on a foot or feet of the user;
    receiving seismic signals by said at least one seismic transducer device and the receiving module; and
    processing the seismic signals by the processing module,
    wherein the at least one seismic transducer device includes: a container defining a chamber filled with a medium having controllable physical properties; and a hydrophone disposed in the medium and affixed to the container,
    wherein the seismic transducer is configurable in both a transmitter configuration and a receiver configuration,
    wherein in the transmitter configuration the seismic transducer is arranged to transmit seismic waves having a specified pattern into a second medium coupled to the membrane, and
    wherein in the receiver configuration the seismic transducer is arranged to receive seismic waves having a specified pattern propagating through a second medium coupled to the membrane.

13. The method according to claim 12, the method further comprising: providing a communication module; and displaying information and inputting commands using an input/output (I/O) device communicating with the unit using the communication module.

14. The method according to claim 12, further comprising emitting audio signals using an earphone in response to seismic signals received by the transducer device of the unit.

15. The method according to claim 14, wherein the audio signals are selected from the group of audio signals consisting of seismic signals picked up by the transducer device and transposed into the audio range of a human ear, audio signals or messages which are played when a specific condition is met and audio signals in the form of vibrations designed to be sensed by the user as they travel through the skull bone and are picked up by the ear.

* * * * *